United States Patent [19]

Nell et al.

[11] Patent Number: 5,080,025
[45] Date of Patent: Jan. 14, 1992

[54] COCURRENT OXIDATION METHOD IN A MULTIPLE HEARTH FURNACE

[75] Inventors: David J. Nell, Oradell; Gordon W. Czop, Garfield, both of N.J.; Wayne G. Schuliger, Coraopolis, Pa.

[73] Assignee: Marquess and Nell, Inc., New York, N.Y.

[21] Appl. No.: 605,034

[22] Filed: Oct. 29, 1990

[51] Int. Cl.[5] .............................. F23G 5/00
[52] U.S. Cl. .................... 110/247; 432/139; 110/346
[58] Field of Search ............ 110/247, 248, 346; 432/124, 139

[56] References Cited

U.S. PATENT DOCUMENTS

| | | | |
|---|---|---|---|
| 1,549,379 | 8/1925 | Pike | 432/139 |
| 2,089,306 | 8/1937 | Stimmel et al. | 432/139 |
| 2,505,363 | 4/1950 | Nichols | 110/247 |
| 3,680,503 | 8/1972 | Danielsson et al. | 110/247 |
| 3,962,128 | 6/1976 | Nelson et al. | 432/139 |
| 4,046,086 | 9/1977 | Von Dreusche, Jr. | 432/139 |
| 4,248,164 | 2/1981 | Isheim | 110/247 |
| 4,391,208 | 7/1983 | Lewis | 432/139 |

Primary Examiner—Henry C. Yuen
Attorney, Agent, or Firm—Webb, Burden, Ziesenheim & Webb

[57] ABSTRACT

A method of oxidizing feed materials using a multiple hearth furnace comprises the steps of introducing the feed materials to be oxidized on at least the uppermost hearth, introducing fuel/air mixtures in the uppermost hearth to dry and ignite the feed materials, introducing air on at least one hearth to support combustion of the feed materials, allowing the feed materials to move downwardly from hearth to hearth and thereafter to exit the bottom of the furnace, and causing the combustion products formed by oxidation of the fuel and feed materials to be drawn down through the furnace and exhausted from a lower hearth.

12 Claims, 5 Drawing Sheets

COCURRENT OXIDATION METHOD IN A MULTIPLE HEARTH FURNACE

BACKGROUND OF THE INVENTION

1. Field of the Invention

The present invention relates generally to oxidization of organic materials in a multiple hearth furnace and, more particularly, to the incineration of sludges and the reactivation of spent activated carbon.

2. Description of the Prior Art

Conventionally, sludge is burned in a multiple hearth furnace ("MHF") in the countercurrent mode; this is illustrated in FIG. 2. Typically, there is a sludge drying zone, a sludge burning zone and an ash cooling zone; air and combustion products travel countercurrently to the sludge and ash. Often, an afterburner is required to oxidize organic materials in the exhaust gases.

Difficulties with this system have become apparent as sludge dewatering has improved over the last few years, resulting in a drier sludge fed to the MHF. This dry sludge can burn at too high a temperature causing damage to the furnace, volatilization of heavy metals, and melting of ash to form slag. The burning process is also unstable because unavoidable small variations in the sludge quality or feed rate cause large variations in furnace operation.

Prior attempts at overcoming these difficulties have included: pyrolysis (starved air operation) and excess air operation. Pyrolysis or starved air operation involves reducing the amount of air fed to the furnace to control the burning rate. This process has proved difficult to control. With excess air operation, a large excess of air is passed through the furnace to reduce the temperature. Excess air operation is inefficient in terms of fuel consumption and places an extra load on the off-gas cleaning system. The burning process is unstable requiring constant operator attention. This is the way many furnaces are currently operating.

SUMMARY OF THE INVENTION

An object of this invention is to provide an improved method of oxidizing organic material in a multiple hearth furnace (MHF).

It is a further object to provide a process for burning sludge and other organic materials in a MHF utilizing cocurrent flow of solids and gases.

It is yet another object to provide a simpler, more efficient operation and at a lower, more uniform temperature profile on an MHF to reduce the evolution of heavy metals.

It is a still further object to minimize fuel consumption and the quantity of exhaust gases.

Organic material such as sludge is burned in a MHF in cocurrent mode. Sludge is fed to the top of the MHF and progressively rabbled through the furnace. Burners are placed on the top hearth(s) of the furnace and provide heat to dry and ignite the sludge. Air for combustion of the sludge is also introduced into the upper hearths. Air and combustion gases pass downward and exit from the lower part of the furnace. Flow of materials in the cocurrent mode is shown in FIG. 1.

The temperature of the exit gases is maintained automatically at a preset point by modulating the combustion air flow and the firing rate of the burners.

This mode of operation results in a lower and more uniform temperature profile throughout the furnace, minimizing the volatilization of heavy metals contained within the sludge.

Since the exhaust gases exit the furnace near the temperature of the burning zone, reheating them in an afterburner is not normally required.

The present invention can also be used for the oxidation of organic wastes adsorbed or otherwise bound on another material, such as spent activated carbon. In this case, the MHF is operated in a similar fashion as with sludge. An additional advantage when the process is used with these materials is that in the cocurrent mode the adsorbate is initially reacted with highly oxidizing gases. As the carbon progresses through the furnace, the oxidizing ability of the gases decreases, minimizing the risk of oxidizing the carbon itself. This process of regenerating activated carbon is also assisted by the presence of water vapor in the furnace atmosphere at high temperature. In conventional, countercurrent mode, the water vapor is supplied from outside sources of steam. In the cocurrent system, outside sources of steam are generally not required as water vapor is generated during drying and is then passed through the high temperature zone.

Similarly, the system may be used for organically contaminated catalysts, inorganic adsorbents, etc.

In many instances, the fuel efficiency of the cocurrent mode is higher than in conventional practice. However, one of the seeming disadvantages of the downdraft mode is that quite some fuel must be burned in the top of the MHF to partially dry the sludge and bring a portion of it to ignition temperature. However, there are several ways to minimize the amount of fuel required. For example, the sludge feed may be split. In this case, only a portion of the sludge feed needs to be dried and ignited by burning fuel. The remainder of the feed is fed to a lower part of the MHF. An example of this is shown in FIG. 3.

Another method is to recycle a portion of the hot gas leaving the burning zone to the drying zone, this can be done using a fan or an eductor 21. An example of this is shown in FIG. 4.

Another method is to supply hot air to the drying zone using an air-to-gas heat exchanger 22 on the off-gas from the burning zone. An example of this is shown in FIG. 5.

In prior practice, it has not been practical to recycle more than a small portion of the heat leaving a MHF. The main reason for this is that in conventional systems, there are a plurality of burners associated with the furnace and distribution of high temperature air to these burners is not economical. However, in the cocurrent mode, there are fewer burners required and use of high temperature air is practical.

Depending upon the particular service requirements, it may be advantageous to use some of these methods in combination. For example, the split feed system (FIG. 3) may be used in conjunction with recycle of hot gases (FIG. 4).

If it is required to cool the ash before discharge from the furnace, the off-gas may be extracted from the penultimate hearth and cold air introduced into the bottom hearth.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
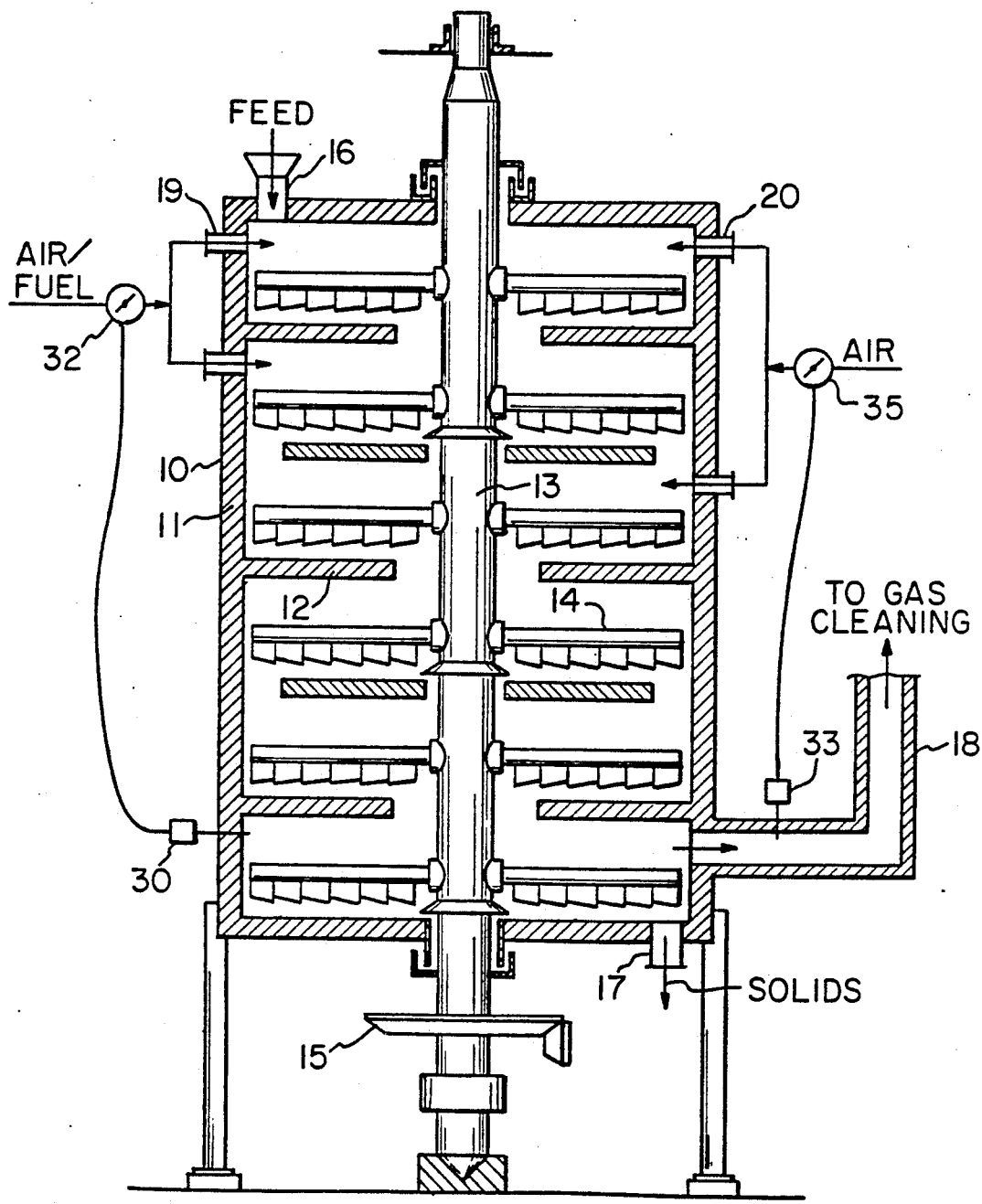
FIG. 1 is a schematic section view of a MHF operated in the cocurrent mode according to this invention.

A diagrammatic representation of apparatus for practice of this invention is shown in FIG. 1. This shows a MHF 10 which includes a steel, refractory-lined, cylindrical body 11 enclosing a plurality of hearths. Hearths 12 have alternating inner and outer openings. A hollow, rotatable shaft 13 extends upwardly through the center of the furnace and the hearths positioned therein. Affixed to the shaft immediately above each of the hearths are a plurality of rabble arms 14. Shaft and arms affixed thereto are rotatably driven by a motor and gear arrangement 15. An opening 16 is formed in the furnace through which the material to be treated is introduced. Another opening 17 is formed at the bottom of the furnace through which uncombusted solid and/or ash is removed from the furnace. Exhaust gases from the furnace exit via a refractory lined duct 18. Burners 19 provide auxiliary heat for the process. Air 20 is admitted to the furnace to support the combustion process.

A control scheme for sludge incineration using the cocurrent system is shown in FIG. 1. A thermocouple 30 in one of the lower hearths is connected to a temperature controller 31 which operates valve 32 to regulate the flow of gas and air to the burners. In this way, a fixed temperature is maintained, for example, 1600° F. on the bottom hearth. At the same time, an oxygen analyzer 33 working through a controller 34 and air control valve 35 is used to maintain an adequate amount of excess air at the furnace exhaust to ensure complete combustion of organic materials in the off-gas. Normally, about 1-3% oxygen is sufficient to ensure that combustion is complete. In circumstances where there is an excessive amount of heating value in the sludge, which could cause higher than desired off-gas temperatures, the oxygen content in the flue gasses may be increased.

Other standard items are required for the system but not shown on the drawings such as the exhaust gas and solids handling systems.

One of the primary features of the invention is the use of water evaporated in the drying zone to absorb heat in the combustion zone. This is done by causing the gases to flow in the same direction as the solid materials, hence, the term cocurrent operation.

Another aspect of this feature is to create a process which is inherently more stable than the countercurrent method of operation. The countercurrent operation is substantially or completely dependent on gases generated in the combustion to cause water to evaporate in upper hearths. Such generation of gases is not subject to effective control, primarily due to normal variations in the quantity or characteristics of the feed materials. In the countercurrent practice, changes in the feed material create a self-reinforcing instability in the operation. The prior art is replete with sophisticated structural and control elements intended to counteract this natural tendency. The cocurrent flow method employs straightforward structural elements which permit precise control of drying and prevent the adverse consequences of normal variations in the feed material.

The advantages of cocurrent operation, including reduced fuel requirements and lower off-gas quantities, are illustrated in a series of prophetic examples (based upon well-known heat balance and material balance calculations) comparing prior art to various embodiments of the invention using the incineration of sewage sludge as an example.

In the examples, the amount and composition of the sewage sludge is taken as follows:

| | |
|---|---|
| 7,100 lbs./hr. | water |
| 2,320 lbs./hr. | combustible solids |
| 580 lbs./hr. | uncombustible solids |
| 10,000 lbs./hr. | Total Sludge |

The characteristics of the combustible solids are taken as follows:

1.26% Sulfur
58.42% Carbon
6.25% Hydrogen
28.42% Oxygen
5.65% Nitrogen
10,500 BTU/lb. higher heating value Auxiliary fuel is natural gas taken at 90% methane, 5% ethane and 5% nitrogen with a higher heating value (HHV) of 21,900 BTU/lb. and fired with 20% excess air.

For purposes of comparison and clarity, the MHF is considered to be comprised of two basic zones—a drying zone from which gases exhaust at 1100° F. and a combustion zone from which gases exhaust at 1600° F. The combustion zone is considered to commence at the point where the solids content of the feed material reaches 50%. An afterburner zone is also required where the off-gases exit the furnace at less than 1600° F.

Radiation and center shaft cooling will be considered to be a 0.8 million BTU/hr. heat loss for each zone.

The calculated heat balance and performance summary presented below in Table A is based on exhaust gas exiting the system at 1600° F. In practice, this temperature may be higher or lower in consideration of practical or regulatory requirements.

TABLE A

Figure 2:
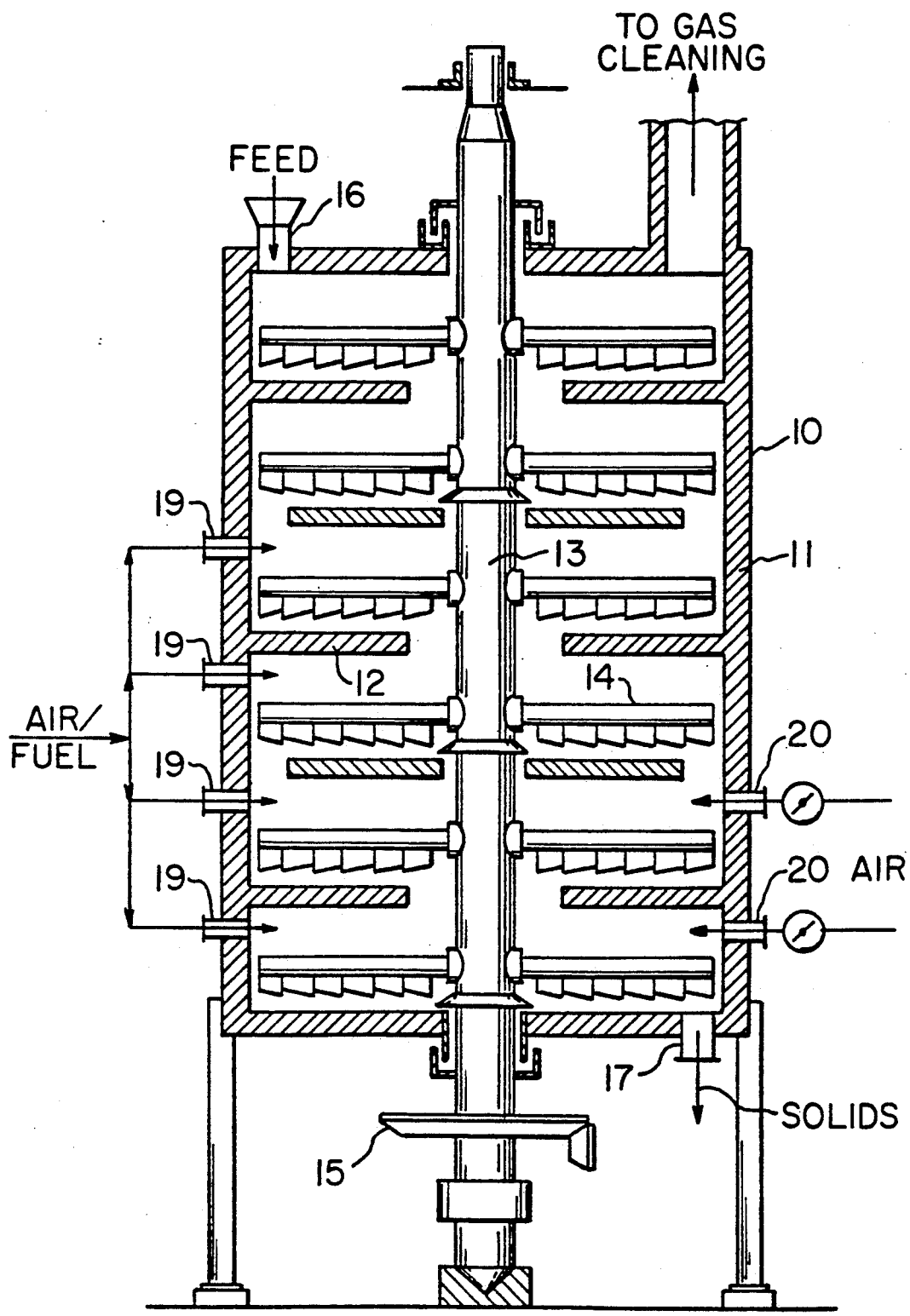
FIG. 2 is a schematic section view of a MHF operated according to the prior art countercurrent method.

| | Cocurrent (FIG. 1) BTU/Hr. × 10⁶ | Countercurrent (FIG. 2) BTU/Hr. × 10⁶ |
|---|---|---|
| Drying Zone, 1100° F. | | |
| Heat Produced | | |
| Auxiliary Fuel | 11.6 | 1.9 |
| Gases from Combustion Zone | 0 | 6.2 |
| Heat Absorbed | | |
| Water | 6.6 | 6.6 |
| Shaft Cooling, etc. | 0.8 | 0.8 |
| Products, Auxiliary Fuel | 4.2 | 0.7 |
| Combustion Zone, 1600° F. | | |
| Heat Produced | 24.4 | 24.4 |
| Combustibles | | |
| Heat Absorbed | | |
| Water | 6.3 | 5.2 |
| Products, Feed Combustibles | 13.0 | 13.0 |
| Shaft Cooling, etc. | 0.8 | 0.8 |
| Non-Combustibles | 0.2 | 0 |
| Products, Aux. Fuel | 1.5 | 0 |
| Excess Air | 2.6 | 5.4 |
| Afterburner, 1600° F. | | |
| Heat Produced | 0 | 15.5 |
| Auxiliary Fuel | | |

TABLE A-continued

|  | Cocurrent (FIG. 1) BTU/Hr. × 10⁶ | Countercurrent (FIG. 2) BTU/Hr. × 10⁶ |
|---|---|---|
| Heat Absorbed |  |  |
| Gases from Drying Zone | 0 | 7.5 |
| Products, Auxiliary Fuel | 0 | 8.0 |
| Performance Summary |  |  |
| Fuel #/Hr. | 526 | 796 |
| Exhaust Gas #/Hr. | 51876 | 64223 |

Figure 3:
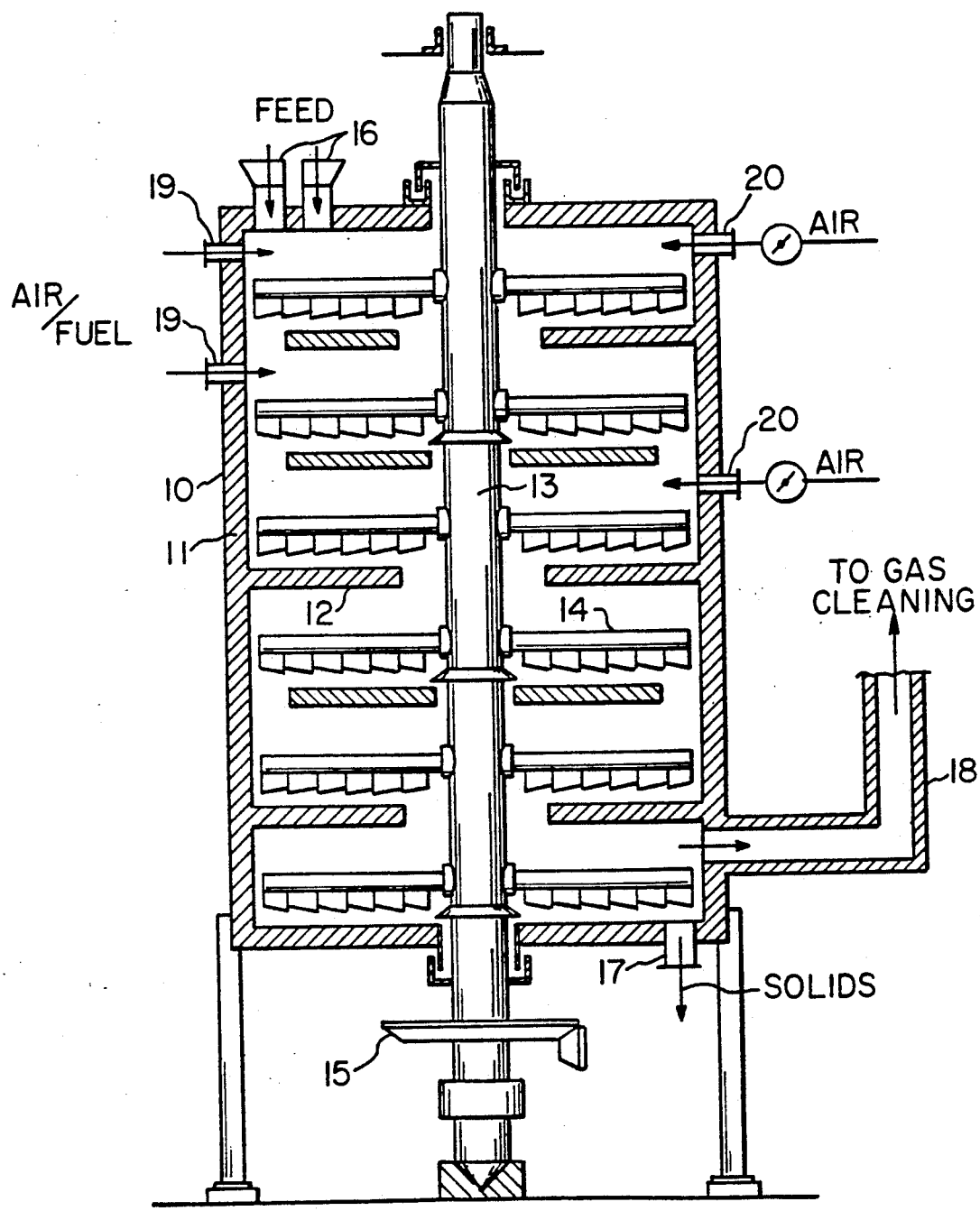
FIGS. 3, 4 and 5 are schematic section views of MHFs operated according to alternate embodiments according to this invention.

A second embodiment of the downdraft process (see FIG. 3) is the division of the feed material so as to introduce a portion of the feed into a hearth(s) where combustion is occurring. This may be accomplished prior to or after the material has entered the furnace. The heat balance and performance summary shown in Table B where 50% of the sludge feed is diverted to the combustion zone. When compared to that for the simple downdraft process, the heat adsorbed by water in the combustion zone is substantially increased while the auxiliary fuel requirement in the drying zone is reduced. Since less excess air and less auxiliary fuel is used, the exhaust gas volume is significantly reduced.

TABLE B

| Cocurrent with Split Feed (FIG. 3) | BTU/Hr. × 10⁶ |
|---|---|
| Drying Zone, 1100° F. |  |
| Heat Produced | 6.4 |
| Auxiliary Fuel |  |
| Heat Absorbed |  |
| Water | 3.3 |
| Shaft Cooling, etc. | 0.8 |
| Products, Auxiliary Fuel | 2.3 |
| Combustion Zone, 1600° F. |  |
| Heat Produced |  |
| Combustibles | 24.4 |
| Shaft Recycle | 1.2 |
| Heat Absorbed |  |
| Water | 9.6 |
| Products, Feed Combustible | 13.0 |
| Shaft Cooling, etc. | 0.8 |
| Non-Combustibles | 0.2 |
| Products, Auxiliary Fuel | 1.3 |
| Excess Air | 0.5 |
| Performance Summary |  |
| Fuel #/Hr. | 292 |
| Exhaust Gas #/Hr. | 41840 |

Figure 4:
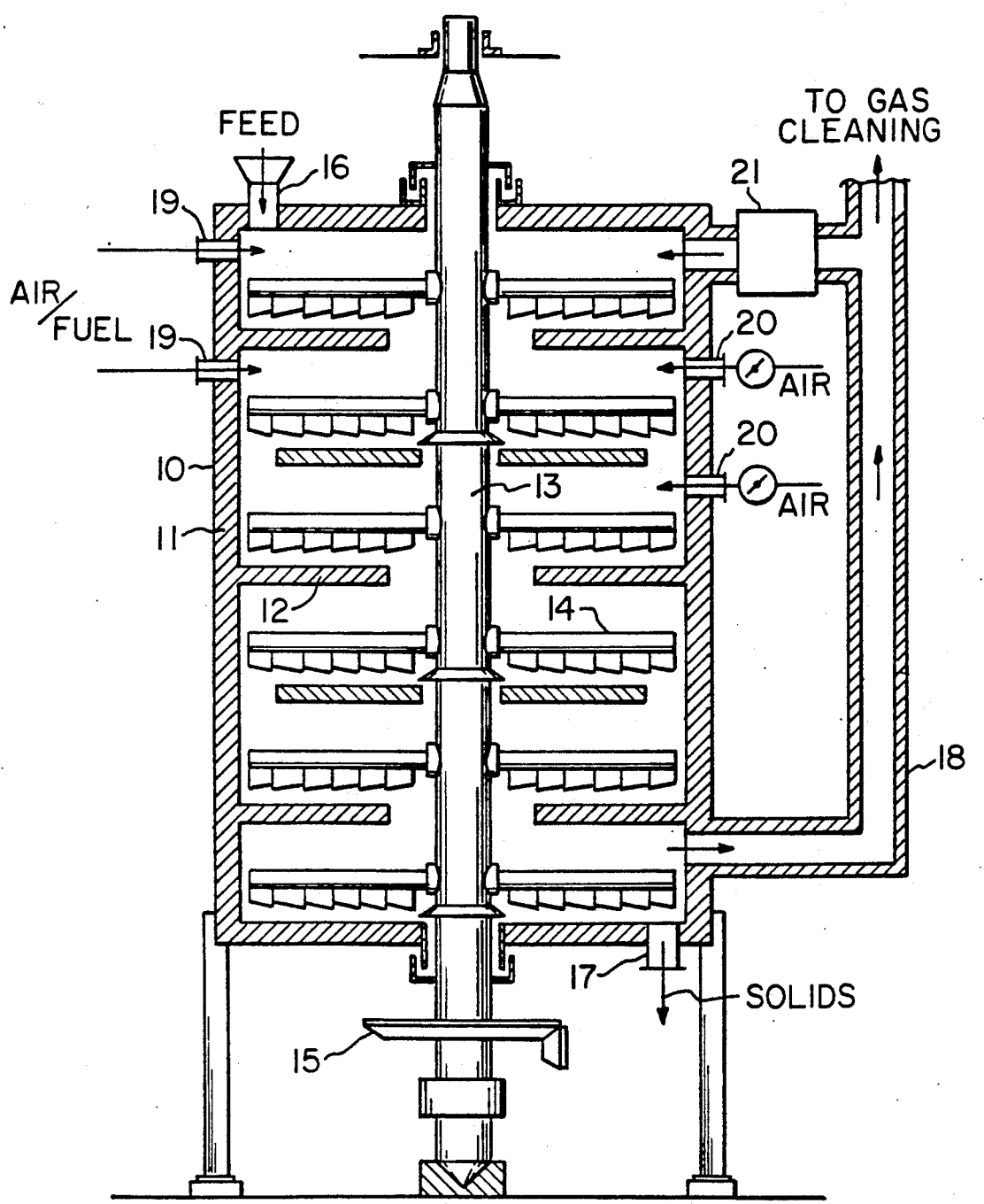

A third embodiment of the downdraft process (see FIG. 4) is the recycling of a portion of the exhaust gases to the upper hearths where drying occurs in the absence of combustion. The heat balance and performance summary shown in Table C illustrates the use of hot exhaust gas to replace auxiliary fuel use. For this example, the auxiliary fuel necessary to complete the overall heat balance is attributed to the combustion zone. In practice, the heat may be added to the recycle stream by way of an external combustion chamber, or burner(s) in one or more of the hearths.

TABLE C

| Cocurrent with Recycle (FIG. 4) | BTU/Hr. × 10⁶ |
|---|---|
| Drying Zone, 1100° F. |  |
| Heat Produced | 7.4 |
| Recycle Gas |  |
| Heat Absorbed |  |
| Water | 6.6 |
| Shaft Cooling, etc. | 0.8 |

TABLE C-continued

| Cocurrent with Recycle (FIG. 4) | BTU/Hr. × 10⁶ |
|---|---|
| Combustion Zone, 1600° F. |  |
| Heat Produced |  |
| Combustibles | 24.4 |
| Shaft Recycle | 1.2 |
| Auxiliary Fuel | 5.1 |
| Heat Absorbed |  |
| Water | 6.3 |
| Products, Feed Combustible | 13.0 |
| Shaft Cooling, etc. | 0.8 |
| Non-Combustibles | 0.2 |
| Products, Auxiliary Fuel | 2.5 |
| Recycle Gas | 7.4 |
| Excess Air | 0.5 |
| Performance Summary |  |
| Fuel #/Hr. | 228 |
| Exhaust Gas #/Hr. | 40.964 |

Figure 5:
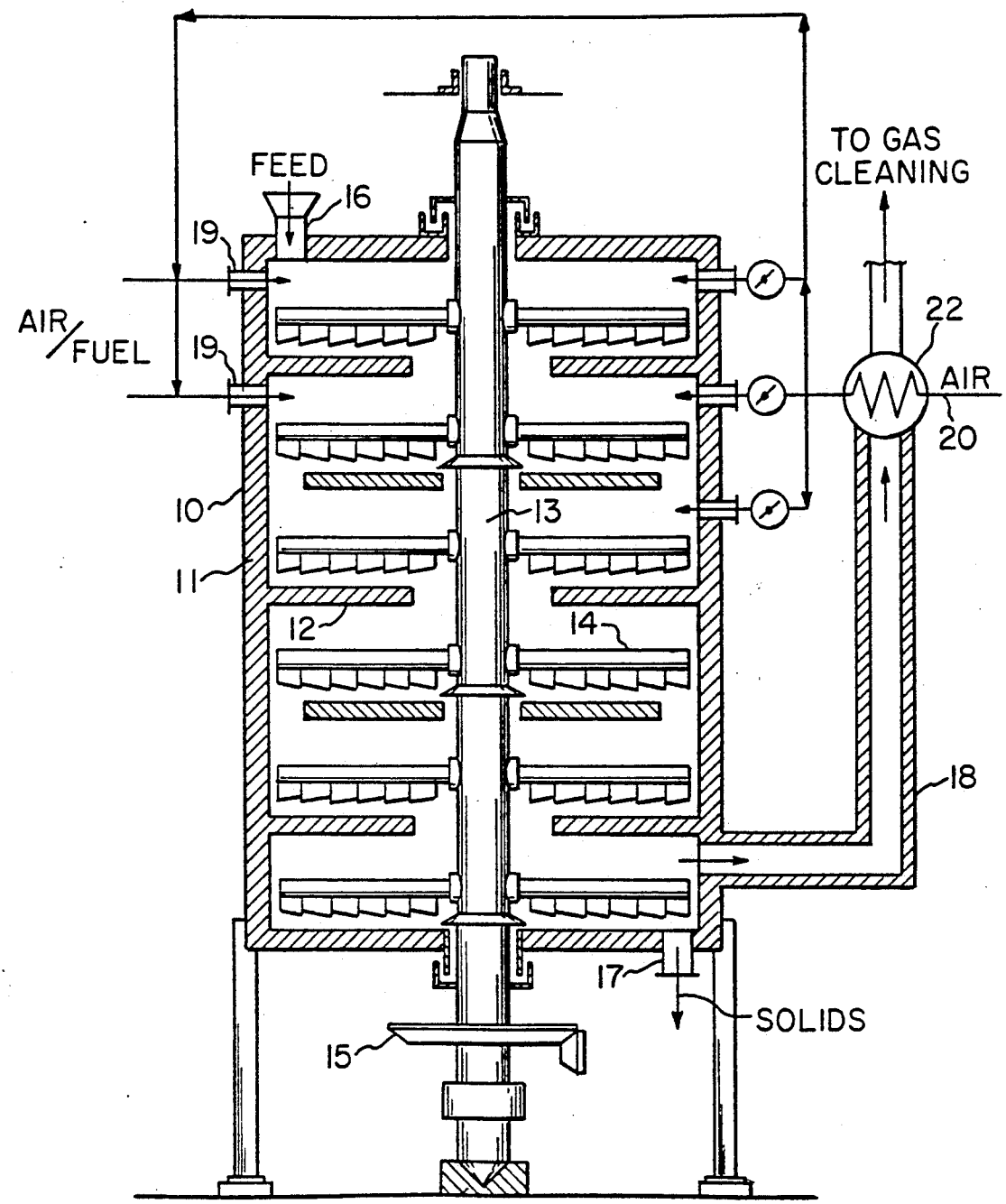

A fourth embodiment of the downdraft process (see FIG. 5) is recovery of heat from the exhaust gases using a heat exchanger to preheat combustion air. The combustion air is to be used in one or more burners firing into a combustion chamber or directly into the hearths or introduced directly into the furnace. A heat balance and performance summary for this embodiment is shown in Table D.

TABLE D

| Cocurrent with Exhaust Heat Exchanger (FIG. 5) | BTU/Hr. × 10⁶ |
|---|---|
| Drying Zone, 1100° F. |  |
| Heat Produced |  |
| Auxiliary Fuel | 7.7 |
| Preheated Air | 2.0 |
| Heat Absorbed |  |
| Water | 6.6 |
| Shaft Cooling, etc. | 0.8 |
| Products, Auxiliary Fuel | 2.3 |
| Combustion Zone, 1600° F. |  |
| Heat Produced | 24.4 |
| Combustibles |  |
| Heat Absorbed |  |
| Water | 6.3 |
| Products, Feed Combustible | 13.0 |
| Shaft Cooling, etc. | 0.8 |
| Non-Combustibles | 0.2 |
| Products, Auxiliary Fuel | 1.2 |
| Excess Air | 2.9 |
| Performance Summary |  |
| Fuel #/Hr. | 445 |
| Exhaust Gas #/Hr. | 52865 |

Having thus described our invention with the detail and particularity required by the Patent Laws, what is claimed and desired to be protected by Letters Patent is set forth in the following claims.

We claim:

1. A method of oxidizing feed materials using a multiple hearth furnace comprising the steps of:
    a) introducing the feed materials to be oxidized on at least the uppermost hearth,
    b) introducing fuel/air mixtures in the uppermost hearth to dry and ignite the feed materials,
    c) introducing air on at least one hearth to support combustion of the feed materials,
    d) allowing the feed materials to move downwardly from hearth to hearth and thereafter to exit the bottom of the furnace, and e) causing the combustion products formed by oxidation of the fuel and feed materials to be drawn down through the furnace in a direction cocurrent with the direction of movement of the feed materials and to be exhausted from a lower hearth.

2. The method of claim 1, wherein the fuel/air mixture is introduced on at least the uppermost hearth.

3. The method according to claim 1, wherein the fuel/air mixture is introduced on at least the two uppermost hearths.

4. The method of claim 1, wherein the air is added on at least one intermediate hearth.

5. The method according to claim 1, wherein air is added on several upper hearths.

6. The method according to claim 1, wherein a portion of the feed materials is introduced on the uppermost hearth and the remainder are introduced on lower hearths.

7. The method of claim 1, wherein a portion of the exhaust gases near the bottom of the furnace is returned to the uppermost hearths.

8. The method according to claim wherein the exhaust gases are passed through a heat exchanger to heat the air supplied near the top of the furnace.

9. The method according to claim wherein the temperature of at least one lower hearth is monitored and the amount of air introduced to oxidize the materials is controlled to bring the monitored temperature within a desired range.

10. The method according to claim 1, wherein the feed material comprises waste sludges and sufficient air is added to substantially entirely oxidize the feed material.

11. The method of claim 1, wherein the feed material is an organically contaminated catalyst and sufficient air is added to substantially entirely oxidize the organic contaminants.

12. The method according to claim 1, wherein the feed material is contaminated activated carbon and sufficient air is added to oxidize the contaminants but not sufficient to oxidize more than a thin surface layer of the activated carbon.

* * * * *

UNITED STATES PATENT AND TRADEMARK OFFICE
CERTIFICATE OF CORRECTION

PATENT NO. : 5,080,025

DATED : January 14, 1992

INVENTOR(S) : David J. Nell, Gordon W. Czop and Wayne G. Schuliger

It is certified that error appears in the above-identified patent and that said Letters Patent is hereby corrected as shown below:

Claim 8 Line 1 Column 8 "claim" should read --claim 1,--.

Claim 9 Line 4 Column 8 "claim" should read --claim 1,--.

Signed and Sealed this

Eighteenth Day of May, 1993

*Attest:*

MICHAEL K. KIRK

*Attesting Officer*     Acting Commissioner of Patents and Trademarks